United States Patent [19]

Kurts

[11] Patent Number: 5,392,285
[45] Date of Patent: Feb. 21, 1995

[54] CASCADING TWISTED PAIR ETHERNET HUBS BY DESIGNATING ONE HUB AS A MASTER AND DESIGNATING ALL OTHER HUBS AS SLAVES

[75] Inventor: Tsvika Kurts, Haifa, Israel

[73] Assignee: Intel Corporation, Santa Clara, Calif.

[21] Appl. No.: 40,504

[22] Filed: Mar. 31, 1993

[51] Int. Cl.$^6$ .................................................. H04J 3/02
[52] U.S. Cl. ........................ 370/85.2; 370/85.3; 370/85.6; 370/94.3; 340/825.5
[58] Field of Search ............. 370/85.2, 85.3, 85.6, 370/94.3; 340/825.5

[56] References Cited

U.S. PATENT DOCUMENTS

| | | | |
|---|---|---|---|
| 4,417,334 | 11/1983 | Gunderson et al. | 370/94.3 X |
| 4,701,756 | 10/1987 | Burr | 340/825.02 |
| 4,866,702 | 9/1989 | Shimizu et al. | 370/60 |

FOREIGN PATENT DOCUMENTS 4-199938  7/1992  Japan ..................... H04L 12/44

*Primary Examiner*—Douglas W. Olms
*Assistant Examiner*—Russell W. Blum
*Attorney, Agent, or Firm*—Owen L. Lamb

[57] ABSTRACT

A hub in a star local area network (LAN) in which a number of slave hubs are connected to a master hub. A number of slave stations are connected to each slave hub. A SREQ link and a MACK link connect the master hub and the slave hubs. A slave local preferred station is selected at the slave hub from among ones of the slave stations that attempt to transmit a frame simultaneously. The slave transmits a slave local preferred station frame over the SREQ link. A master preferred station is selected at the master hub from among the slave local preferred station frame and ones of the plurality of master local stations that attempt to transmit a frame simultaneously. A small FIFO at each hub is provided to maintain collision resolution. Upon a condition that a master preferred station ID and a slave local preferred station ID are not identical, the slave hub flushes its small FIFO and adds the local preferred station to its local non-preferred station list. Then, the slave hub stores the master preferred station frame (MACK frame) in the small FIFO. In parallel, the slave hub transmits the MACK frame to its local stations. Upon a condition that the master preferred station ID and the slave local preferred station ID are identical the slave hub continues to transmit its local preferred station frame to the master hub over the SREQn link and, in parallel, continues to store it in the slave hub small FIFO. An improved fairness and deterministic precedence algorithm ensures that a station which is in back-off and does not attempt to link does not lose its priority with reference to other transmitting stations.

11 Claims, 7 Drawing Sheets

CASCADING TWISTED PAIR ETHERNET HUBS BY DESIGNATING ONE HUB AS A MASTER AND DESIGNATING ALL OTHER HUBS AS SLAVES

BACKGROUND OF THE INVENTION

Cross-references to Related Applications

Copending patent application Ser. No. 07/996,699 filed Dec. 24, 1992, of Tsvika Kurts, entitled "TWISTED PAIR ETHERNET HUB FOR A STAR LOCAL AREA NETWORK" assigned to Intel Corporation, the assignee of the present invention.

1. Field of the Invention

The invention relates to data processing systems and more particularly to a method and apparatus for communicating among a plurality of local area networks that are connected together.

2. Description of the Related Art

A Local Area Network, or LAN, is a data communications system which allows a number of independent devices to communicate with each other within a moderately sized geographical area. The term LAN is used to describe networks in which most of the processing tasks are performed by a workstation such as a personal computer rather than by shared resources.

A LAN node consists of a desktop workstation which performs processing tasks and serves as the user's interface to the network. A wiring system connects the workstations together, and a software operating system handles the execution of tasks on the network.

The configuration of the various pieces of the network is referred to as the topology. In a star topology, such as that defined in the IEEE 802.3 10baseT network standard or the 100 Mbps ETHERNET local area network based on a star topology, the switching control is at the center of the network. All of the attached devices, the individual workstations, shared peripherals, and storage devices, are on individual links directly connected to the center of the star. In the star configuration, all of these devices communicate with each other through the center which receives signals and transmits them out to their appropriate destinations. In the above-referenced copending patent application Ser. No. 07/996,699 a hub is described for a star local area network. The hub increases the link throughput by providing a means for reducing the number of collisions and the collision penalty when collisions do occur. A plurality of stations are connected to a common hub. A selection logic selects a preferred station and a preferred station frame from among ones of the plurality of stations that attempt to transmit a frame simultaneously. The selection logic performs a precedence algorithm, the ones of the plurality of stations that attempt to transmit a frame that are not selected being designated as non-preferred stations. A preferred station frame (which includes a destination address) is transmitted from the preferred station to pass through the common hub to the plurality of stations. A decoder decodes the destination address of the selected frame to thereby identify a destination station of the preferred station. A collision detector detects a collision detect signal from the non-preferred stations that attempt to transmit a frame. A small FIFO (first-in first-out buffer) in the switching means stores the preferred station frame from the preferred station, upon the condition that the collision detection means detects a collision detect signal from the destination station.

It is desirable to be able to connect together two or more hubs of the type described above to increase the number of ports and thereby expand an existing network to accommodate more stations.

It is an object of the present invention to provide a method and means of connecting together two or more hubs to increase the number of ports.

It is a further object of the present invention to provide a multi-hub precedence algorithm that is distributed and is executed in parallel in all of the hubs, such that the performance penalty due to cascading the hubs is low.

SUMMARY OF THE INVENTION

Briefly, the above objects are accomplished in accordance with the invention by connecting a slave hub to a master hub. A number of slave stations are connected to the slave hub. A number of master stations are connected to the master hub. A SREQ link and a MACK link connect the master hub and the slave hub. A slave local preferred station is selected at the slave hub from among ones of the slave stations that attempt to transmit a frame simultaneously. The slave transmits a slave local preferred station frame over the SREQ link to the master hub. This selection is performed by a distribution algorithm and it is done in parallel at all of the slave hubs. A master preferred station is selected at the master hub from among all the slave hubs local preferred station frame and the master local stations that attempt to transmit a frame simultaneously. A master preferred station frame is transmitted over the MACK link, the master preferred station frame including a source address. The slave hub decodes a source address in the master preferred station frame received at the slave hub to thereby identify a station source ID at which the master preferred station frame originates. The slave hub continues to transmit the master preferred station frame to the slave local stations. A slave FIFO stores the master preferred station frame upon a condition that the station source ID and the slave local preferred station ID are not identical. The slave hub transmits the master preferred station frame to the master hub over the SREQ link upon a condition that the station source ID and the slave local preferred station ID are identical.

In accordance with an aspect of the invention an improved fairness and deterministic precedence algorithm ensures that a station which is in backoff and does not attempt to link does not lose its priority with reference to other transmitting stations.

The invention has the advantage that the algorithm is distributed and is executed in parallel in all of the hubs, thus the performance penalty due to cascading the hubs is low.

The invention has the further advantage that the probability that a hub will not succeed in transmitting from its small internal FIFO with the updated depth) is reduced to almost zero.

The foregoing and other objects, features, and advantages of the invention will be apparent from the following more particular description of a preferred embodiment of the invention as illustrated in the accompanying drawings.

DESCRIPTION OF THE PREFERRED EMBODIMENT

ETHERNET is a trademark for a local area network (LAN) standard capable of linking nodes using coaxial cable in a bus network topology. The present invention conforms to the ETHERNET standard and to the IEEE 802.3 10 base T network standard. It will be readily understood by those skilled in the art that the invention can also be used with the 100 Mbps ETHERNET proposed industry standard.

The ETHERNET frame format is as follows:
7 bytes preamble
1 byte SFD
6 bytes Destination Address (DA)
6 bytes Source Address (SA)
2 type/frame length (LEN)
46–1500 bytes Data (250 bytes are assumed to be the average in this specification)
4 bytes Cyclical Redundancy Check (CRC)

Cascaded Hubs

Figure 1:
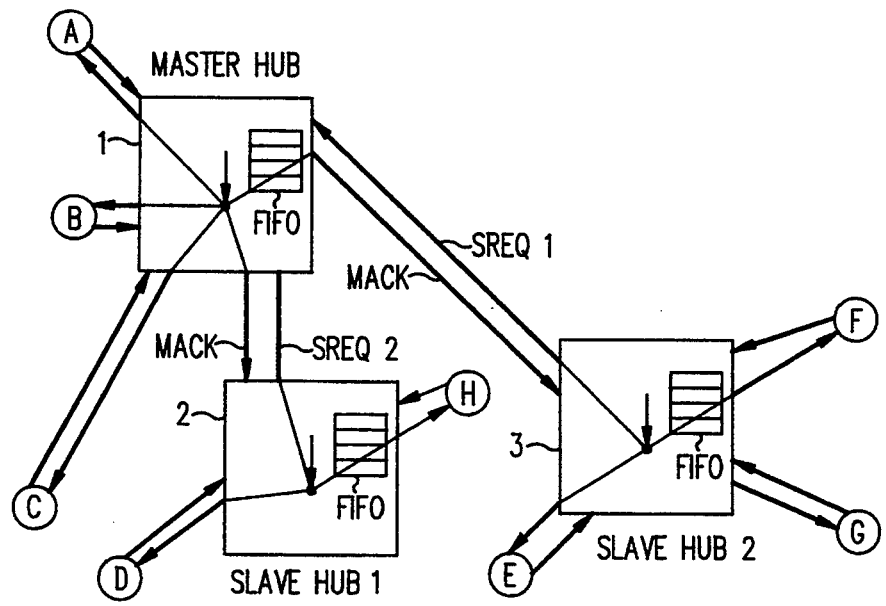
FIG. 1 is a block diagram of cascaded star local area networks in which the present invention is embodied.

Refer to FIG. 1 which is a block diagram of cascaded star local area networks in which the present invention is embodied. A single hub (1) is designated as a master hub. All other hubs in the cascaded network are designated as slave hubs. Two slave hub (2, 3) are shown in FIG. 1. Slave hubs are connected to the master hub over separate ports. Two control lines are provided at each port:

(1) SREQn, Slave REQuest, where n is the master port number. SREQn is a twisted pair (Tp) link which is connected from a slave hub to the master hub.

(2) MACK, Master ACKnowlege. MACK is a twisted pair (Tp) link which is a common link and is connected from the master hub to all of the slave hubs.

A number of nodes are connected to each hub. A node consists of a desktop workstation which performs processing tasks and serves as the user's interface to the network. The master hub (1) has node A, node B and node C connected to it, as well as two slave hubs, slave hub 1 (2) and slave hub 2 (3). The slave hub (2) has node D and node H connected to it. The slave hub (3) has node E, node F, and node G connected to it.

Figure 2:
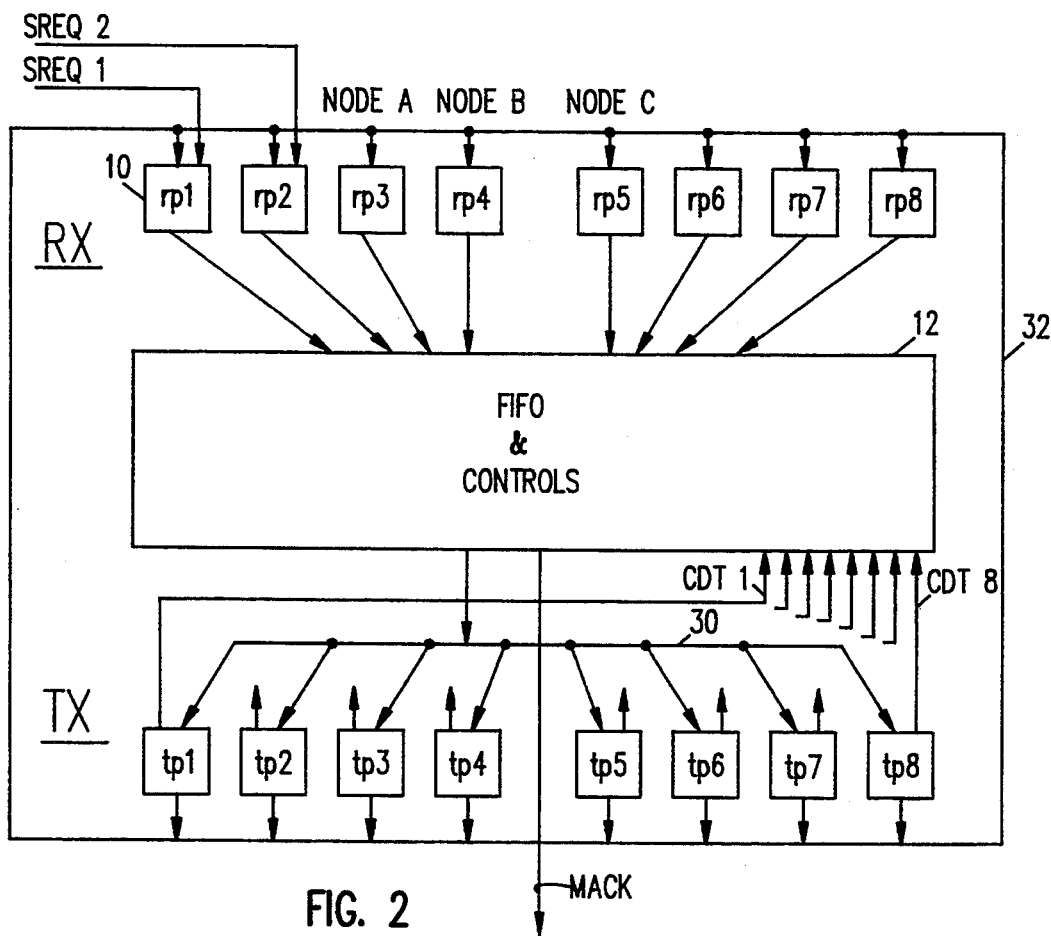
FIG. 2 is a block diagram of the master hub shown in FIG. 1.

Refer to FIG. 2 which is a block diagram of the master hub shown in FIG. 1. A slave hub is similar. Software sets the hub up as either a master hub or a slave hub, in accordance with it location in the network configuration shown in FIG. 1. If the hub is a master, then the MACK line is an output from the hub and the SREQ 1, SREQ 2, SREQ 3, . . . lines are inputs to the hub. If the hub is a slave, then the MACK line is an input to the hub and the SREQ 1, SREQ 2, SREQ 3, . . . lines are outputs from the hub.

As more fully described in the above referenced application Ser. No. 07/996,699, the Receive TPE Link Interface is an array of TPE transceivers (10) which interface between the rp (Receive Pair) connecting the link to the hub. In FIG. 2 the number of ports is 8.

The FIFO & Controls logic (12) latches all the CRS (Carrier Sense) signals (CRS 1-CRS 8). A state machine is provided to handle the CRS# sampling. The sampled CRS are inputs to a Precedence Algorithm. The Precedence Algorithm selects a workstation which is designated the "preferred station". A state machine is provided to implement the precedence algorithm.

An internal small First In First Out (FIFO) buffer is provided to temporarily store the preferred station frame. A state machine is provided to handle the FIFO.

Transmit Controls including a Destination Address Decoder, a Collision Detector and retransmit logic are provided. The Destination Address Decoder decodes the destination address of the preferred station frame, which is stored in the internal FIFO. A state machine and decoder are provided for the destination address routing. The Collision Detector detects a collision if it determines that the receiving station corresponding to the preferred station frame is also attempting to transmit. The collision is detected if the preferred frame Destination Address matches a non-preferred station list. The preferred station list is generated by the hub which determines which stations are attempting to transmit by monitoring the Carrier Sense (CRS#) signal corresponding to each station. A state machine is provided to handle the hub collision case.

The Retransmit logic controls a retransmit mechanism for the FIFO. A retransmit of the preferred station frame from the FIFO is always performed immediately after IFS (Inter Frame Spacing) which is defined as 9.6 uS in the IEEE 802.3 standard.

A switching Control logic controls switching from a source to transmit the frame to the TPE link. The sources are the preferred station frame obtained directly from a station, the frame stored in the FIFO, or the collision frame from a collision frame generator. A MUX is provided to select the preferred station.

Receive Controls including a Hub manager, a Port ID and a Collision Frame Generator are provided. The Hub manager implements station management functions in accordance with the IEEE 802.3 standard, statistics and parameters for initialization. The Port ID matches a port to the individual address (IA) station connected to this port. The Collision Frame Generator issues a collision frame to the link when the hub exceeds the amount of time required to retransmit the preferred frame successfully.

Transmit TPE Link Interface (30) is an array of components that provide an interface between the preferred station frame transmitted from the hub and the tp transmit pair cable (32) connected to the stations. All the TX TPE interface components are connected to the same source of the switching control.

Single Hub Topology

For a single hub topology, as described in application Ser. No. 07/996,699, or station, called the preferred station, is dynamically selected to perform a transmission. When two or more stations attempt to transmit simultaneously, one "currently preferred" station is selected, while all others sense collisions. The currently preferred station is dynamically selected by performing a precedence algorithm which is a fairness and deterministic algorithm. If the station receiving from the preferred station also attempts to transmit, then it senses a collision and the hub causes it to recover and enable receiving before transmitting a frame. This is done by delaying the preferred station frame in a small internal FIFO. The hub re-sends the frame from the internal FIFO immediately after IFS while the receive station usually attempts to transmit later. In most cases this ensures a successful reception of the frame. If after a number of attempts the hub does not succeed in transmitting the frame successfully then the hub generates a collision frame.

Multiple Hub Topology

For a multiple hub topology, as shown in FIG. 1, a hub consistently re-sends from the FIFO until it succeeds in transmitting the preferred station frame. If the preferred station frame length is less than the FIFO depth (180 bytes) then the hub resends a maximum of 16 times, reducing the probability of failure to zero. If the preferred station frame length is greater than the FIFO depth, then the hub resends a maximum of m times. If after m attempts (where m is equal to 6 for a FIFO depth of 182 bytes) the hub does not succeed in transmitting the preferred station frame, the hub generates a collision frame to the preferred station. The preferred station treats the collision frame as link event of late collision, because it detects the collision after slot time. The optimum value of m is found in TABLE I described subsequently.

Optimum FIFO Depth

In the above-referenced copending patent application Ser. No. 07/996,699 the FIFO was specified to be 64 to 180 bytes in depth. 64 bytes has been found to be sufficient for a single hub topology. In order to compensate for transmission propagation delay (51.2uS) in a full topology cascaded hub, the FIFO depth is increased two to three times the 64 bytes. Increasing the FIFO depth to 180 bytes also improves the broadcast (multicast) transmit delivery time.

Refer to TABLE I which tabulates the factors taken into consideration in determining the optimum FIFO depth in bytes. In line 6 of this table, a FIFO depth of 150 bytes results in a probability of failure to transmit successfully of $10^{-8}$, or one failure in every 268 million frames. This failure rate is considered the same as zero because the cyclical redundancy check error rate is the same $10^{-8}$. The time to resend in this case is 120 uS. For full topology it is recommended that 32 more bytes be added to the 150 bytes for a total depth of 182 bytes, to compensate for transmission propagation delay. The standard ETHERNET slot time is 51.2 uS, which is twice the round trip delay. In a full topology configuration (2.5 km) the CRS maximum is sensed after half slot time which is 25.6 uS. At the ETHERNET data rate of 10 Mbps 32 bytes are transmitted in 25.6 Us, so 32 more bytes are needed to compensate for transmission propagation delay.

The following assumptions pertain to the TABLE I. It is assumed that the probability (P) of having a collision between a preferred station and its receiving station is every second time: P%=50, and it is assumed that a receiving station collided once: pre-collision=1.

TABLE I

| RESEND | TIME TO RESEND (uS) | ~PROBABILITY | 1/PROBABILITY | PROBABILITY (%) | FIFO (BYTES) |
| --- | --- | --- | --- | --- | --- |
| 1) RE-SEND_1 | 24.0 | $10^{-1}$ | 8 | 12.50000000% | 30 |
| 2) RE-SEND_2 | 43.2 | $10^{-2}$ | 64 | 1.56250000% | 54 |
| 3) RE-SEND_3 | 62.4 | $10^{-3}$ | 1024 | 0.19531250% | 78 |
| 4) RE-SEND_4 | 81.6 | $10^{-4}$ | 32768 | 0.01220703% | 102 |
| 5) RE-SEND_5 | 100.8 | $10^{-6}$ | 2097152 | 0.00038147% | 126 |
| 6) RE-SEND_6 | 120.0 | $10^{-8}$ | 268435456 | 0.00000596% | 150 |
| 7) RE-SEND_7 | 139.0 | $10^{-10}$ | 68719476736 | 0.00000005% | 174 |

Message transfer protocol sequence

Figure 3:
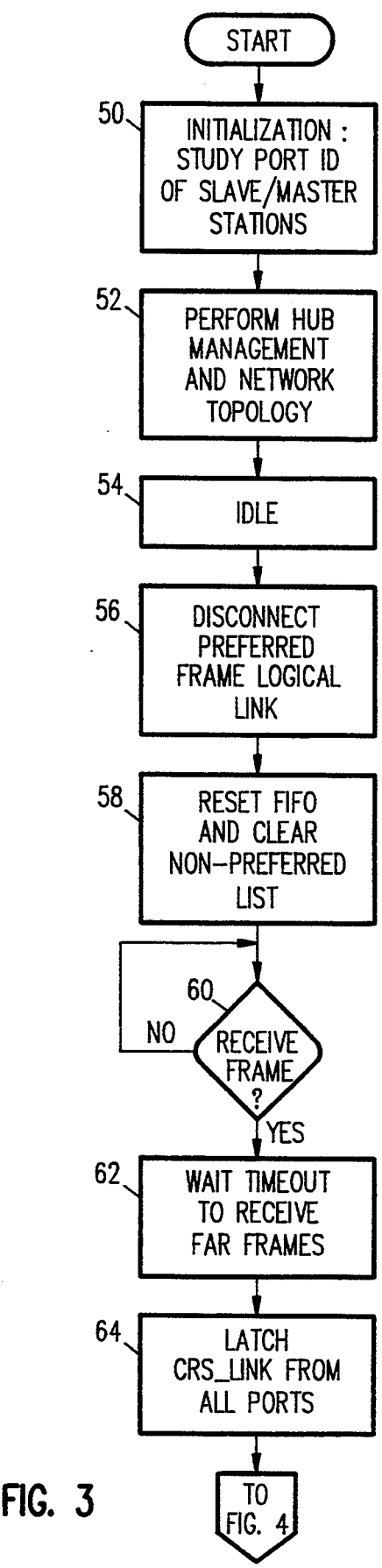
FIGS. 3–6 comprise a flow diagram of a message transfer protocol sequence of the star local area networks of FIG. 1.

FIG. 3-7 are flow diagrams of the message transfer protocol sequence. Refer to FIG. 3. Prior to receiving a frame, the hub initializes itself by first studying the port Id (50) of slave and master stations and then performs hub management functions (52). After an Idle period (54), the hub disconnects preferred frame logical link (56), resets the FIFO and clears non-preferred list (58).

After initialization the hub is now ready to receive a frame (60). The hub waits a time-out period to allow time to receive far frames (62). The hub then latches the carrier sense (CRS) signals on the CRS link from all pods (64).

Figure 4:
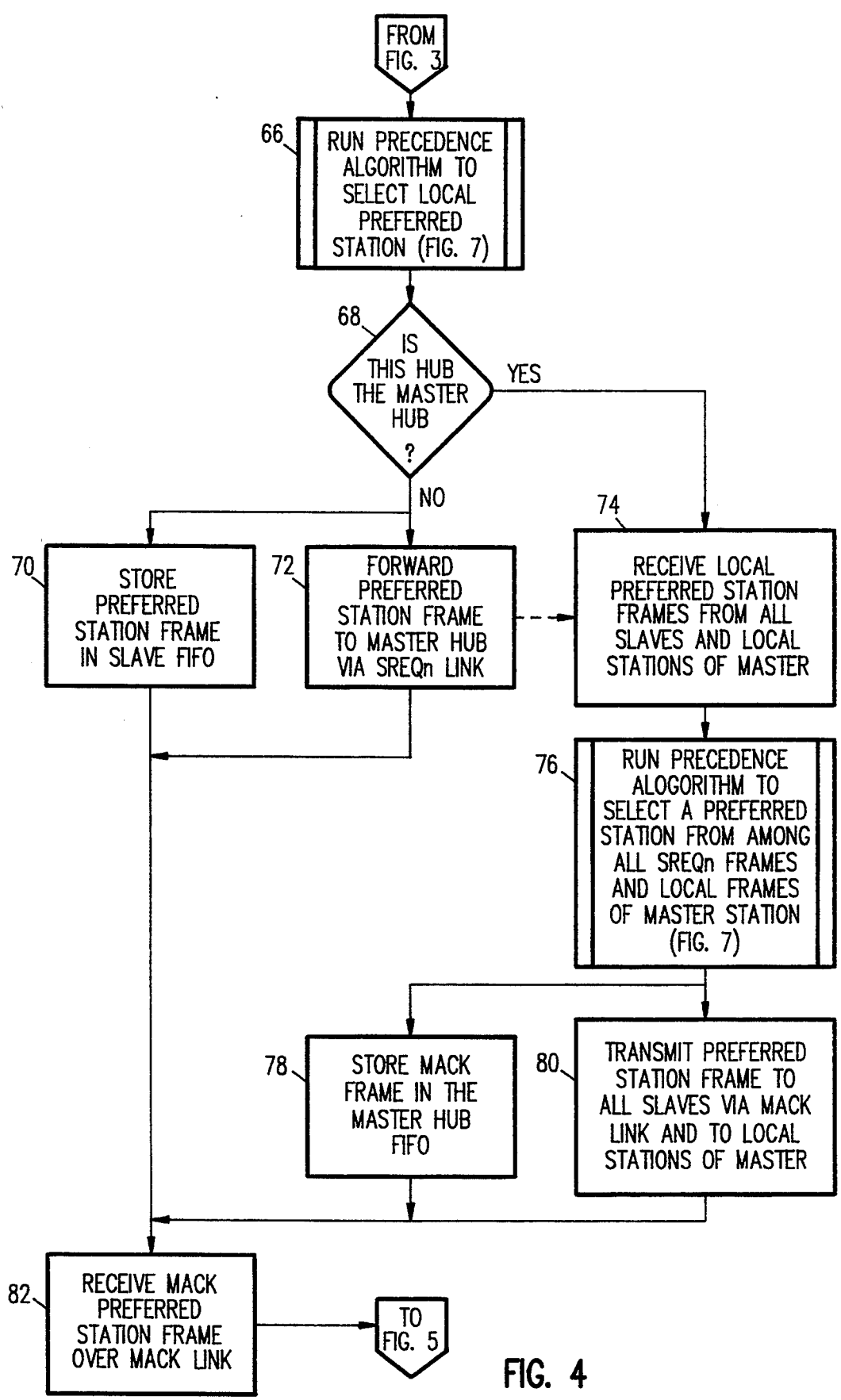

The flow continues on FIG. 4. After the inter frame spacing time-out (IFS) occurs (65), a precedence algorithm (shown in FIG. 7)is run (66) which selects a slave local preferred station at the slave hub from among ones of the plurality of slave stations that attempt to transmit a frame simultaneously. If the hub is not the master hub (a NO from block 68) the slave hub stores the preferred station frame in its FIFO (70) and forwards the slave preferred station frame to the master hub (72).

If the hub is a master hub (a YES from block 68), the flow proceeds to block (74). The master hub senses activity on SREQn, then waits a time-out to ensure that all of the slave local preferred frames are received, even from far slave hubs. The master hub runs a precedence algorithm (76) to select a master preferred station at the master hub from among the slave local preferred station frame and ones of the plurality of master local stations that attempt to transmit a frame simultaneously. The master hub transmits (80) a master preferred station frame to the slave hub over the MACK link. In parallel, the master hub stores (78) the MACK frame (master preferred frame) in the FIFO of the master hub. The master preferred station frame includes a source address.

Figure 5:
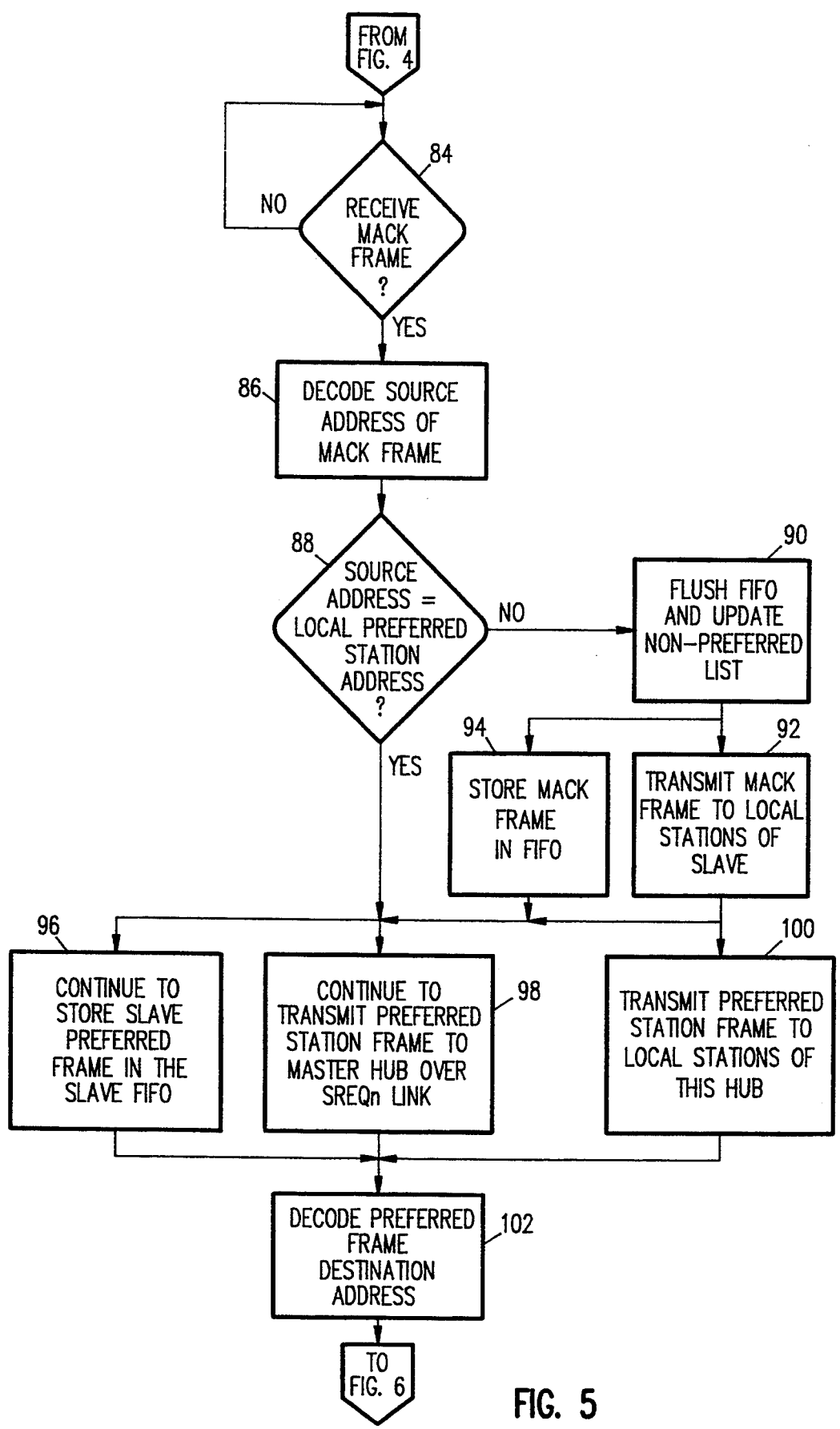
Figure 6:
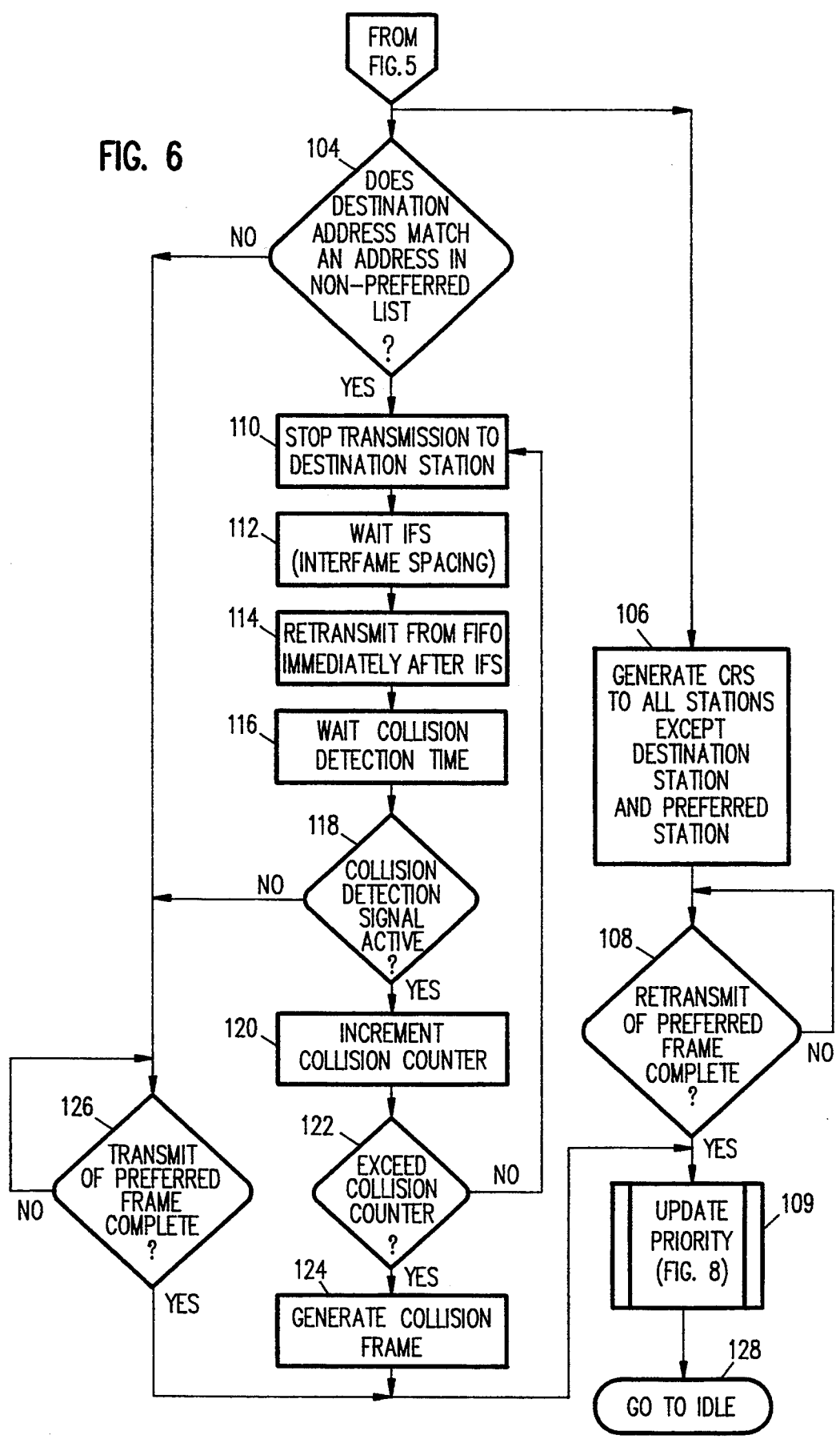
Figure 7:
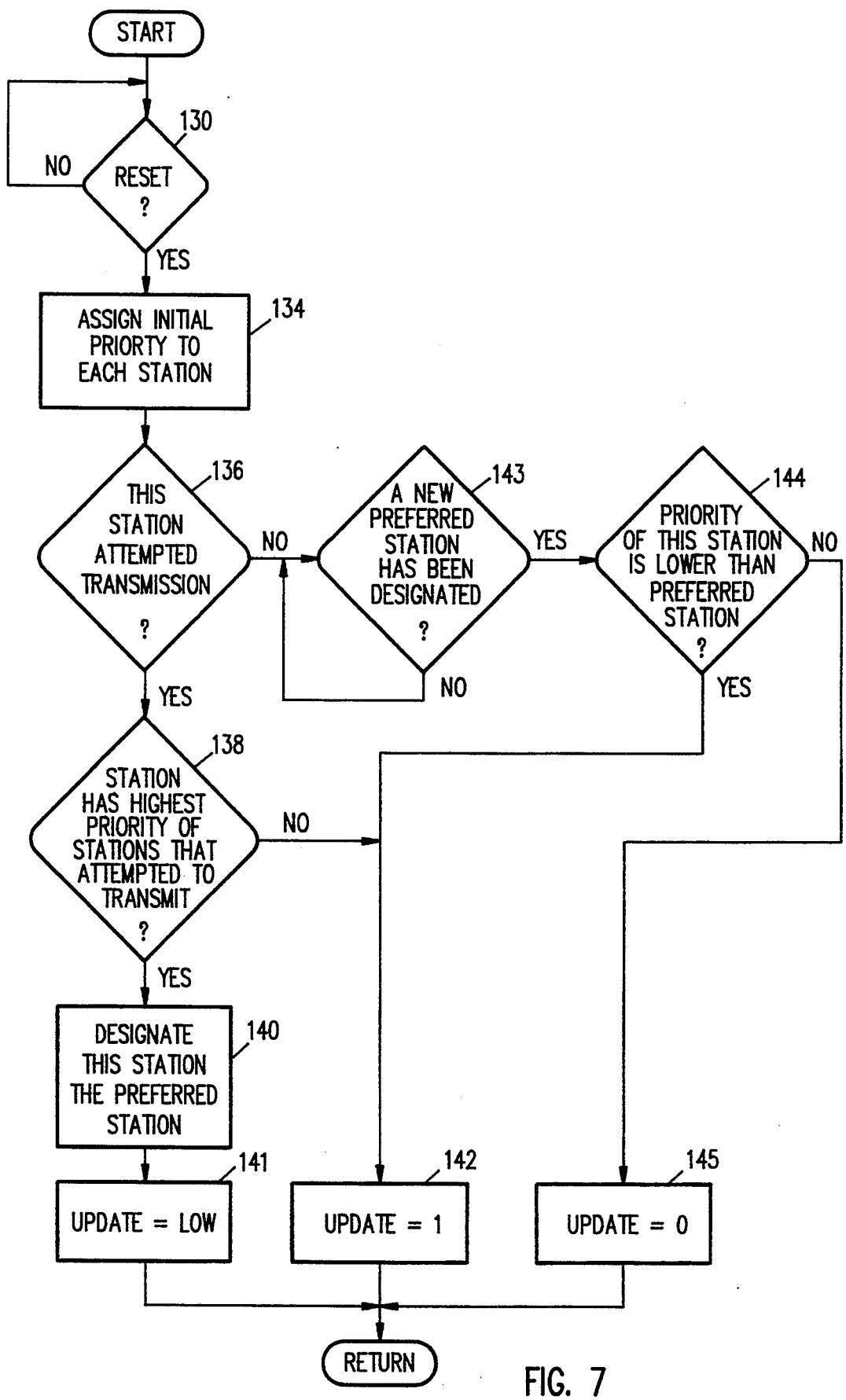
FIG. 7 is a flow diagram of the precedence algorithm of FIG. 4; and,.

Refer to FIG. 5 which shows the process at a slave hub as it receives the MACK frame (84). The source address in the master preferred station frame received at the slave hub is decoded (86) to thereby identify a station source ID at which the master preferred station frame originates. The station source ID is compared (88) with the slave local preferred station ID.

Upon a condition that the master preferred station ID and the slave local preferred station ID are not identical, the slave hub flushes its small FIFO (90) and updates its local non-preferred station list (adds the local preferred station to the list). Then, the slave hub stores the master preferred station frame (MACK frame) in the small FIFO (94). In parallel, the slave hub transmits the MACK frame to its local stations. Upon a condition that the master preferred station ID and the slave local preferred station ID are identical, a yes from decision (88), the slave hub continues to transmit (98) its local preferred station frame to the master hub over the SREQn link and, in parallel, continues to store it in the slave hub small FIFO (96).

Collision

The hub establishes a logical link of the preferred station to TX TPE link and decodes a preferred frame destination address. The flow continues on FIG. 6 in parallel to block (104) and to block (106). The hub generates CRS_ACTIVE to all stations except the destination station. The preferred station (106), completes retransmission of the preferred frame (108) and goes to an idle state (128) when complete. In parallel, the destination address of the preferred station frame is compared with the addresses in the non-preferred station list (104). A similar comparison function is done in parallel in the master hub and all of the slave hubs. If a match is found (YES), then only the specific hub that detects a collision stops transmission to the destination station (110) and waits for the Inter Frame Spacing (112). The hub retransmits from the FIFO immediately after the IFS (114) and waits for the collision detection time (116).

If the collision detection signal is active, a YES from decision block (118), then the hub increments the collision counter (120). If the collision counter is exceeded, a YES from decision block (122), then the hub generates a collision frame (124), performs the update priority subroutine (109) and goes to idle (128) when the update priority subroutine is complete.

If the collision detection signal is not active, a NO from decision block (118), then the hub completes transmission of the preferred frame (126), performs the update priority subroutine (109) and goes to idle (128) when the update priority subroutine is complete.

If the collision counter is not exceeded, a NO from decision block (122), then steps 104–120 are repeated until the collision counter is exceeded. If when the destination address of the preferred station frame is compared with the addresses in the non-preferred station list no match occurs, a NO from decision block (104), the hub completes transmission of the preferred frame (126), performs the update priority subroutine (109) and goes to idle (128) when the update priority subroutine is complete.

Precedence Algorithm

Figure 8:
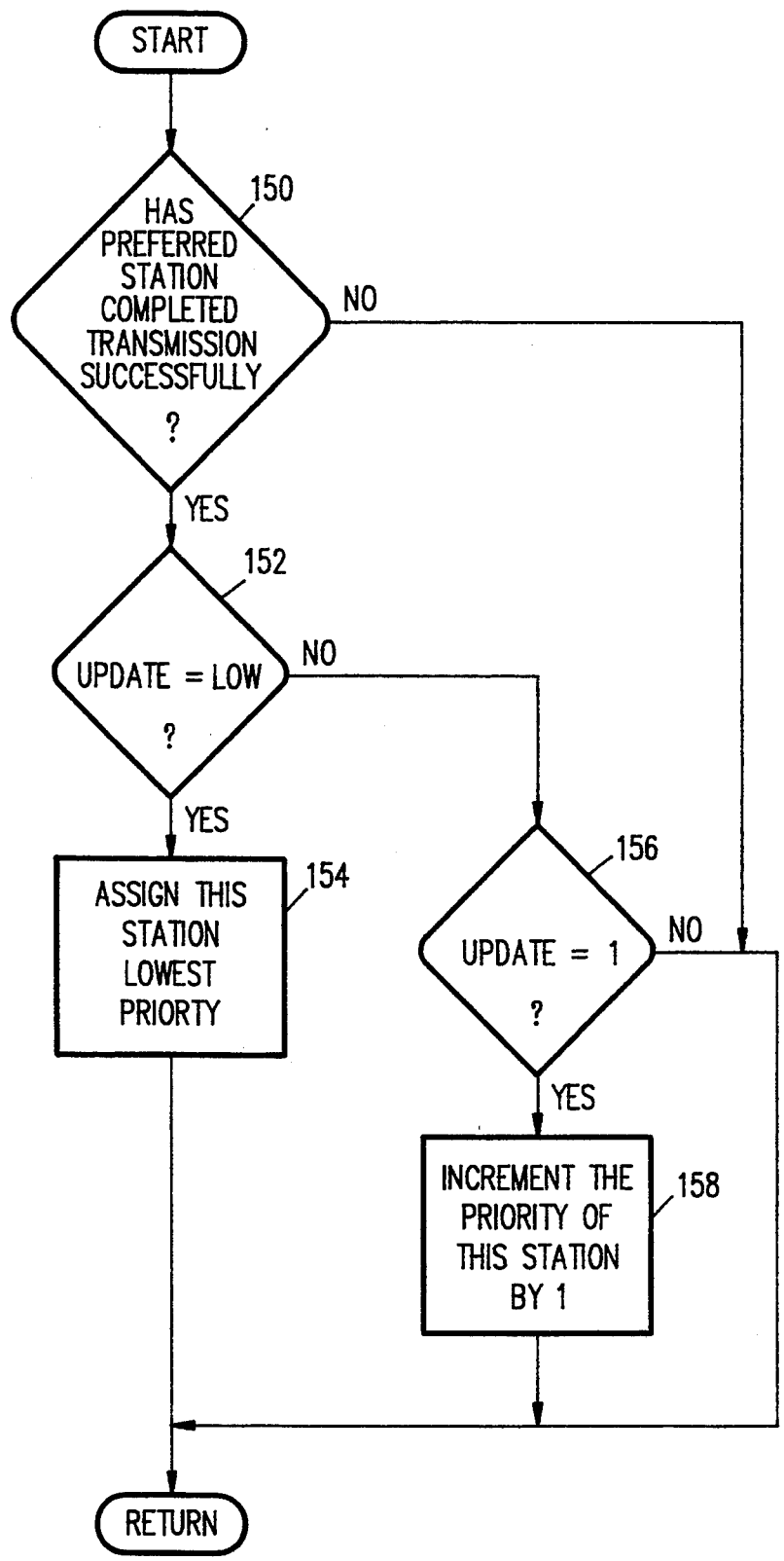
FIG. 8 is a flow diagram of the update priority subroutine of FIG. 6.

In copending patent application Ser. No. 07/996,699 a generalized round-robin algorithm is described which uses a cyclic order with a switch to file server between every two stations. The file server gains overall 50% of the link utilization and the rest of the stations share the rest. By this the file server has a relative priority, but the other stations do not suffer from starvation. An improved precedence algorithm is described with reference to TABLE II below and with reference to FIG. 7 which is a flow diagram of the precedence algorithm and FIG. 8 which is a flow diagram of the update priority subroutine of FIG. 6. The steps of the process are as follows:

1. After reset (130) each of the stations is given an initial priority (134). (Refer to FIG. 7).
2. At the beginning of a current cycle, only stations which attempt to transmit (136) in the current cycle participate in priority resolution.
3. The station with the highest priority among the stations which attempt to transmit (138) is granted access and is designated the preferred station (140).
4. An update to low (141) is effected to prepare for subsequent changes in priority if the attempted transmission is completed.
5. After a new preferred has been designated (143), if the priority of a station is lower than the preferred station, an update to 1 (142) is effected to prepare for subsequent changes in priority if the attempted transmission is completed if the priority of a station is higher than the preferred station, an update to 0 (145) is effected to prepare for subsequent changes in priority if the attempted transmission is completed.
6. At the end of the cycle, the preferred station which had successfully completed transmission (150), in accordance with the update=low (152), is assigned the lowest priority (152). (Refer to FIG. 8.)
7. In accordance with the update=1 (156), the priority level is increased by one level (158) for of all stations whose priority level was equal to 1, a YES from decision (156).
8. In accordance with the update=0 (156), the priority level is left unchanged for all other stations whose priority level update was equal to 0, a NO from decision (156).
9. If at the end of the cycle, the preferred station has not successfully completed transmission, a No from decision (150), there is no need to change priority levels, so no changes are made in the priority level assignments.

Refer now to TABLE II which is an example over 4 cycles. Each of six stations (A–F) is given an initial priority after reset. Station A has the highest priority (level 6) or least recently used (LRU) status and station F has the lowest (level 1) or most recently used (MRU) status.

In cycle 1, stations C and E attempt to transmit. Station C has a priority level of 3 and is selected as the preferred station. Station E has a priority level of 2 which is lower than station C. Station E has thus collided for the first time.

In cycle 2, station C which successfully completed transmission (it was previously the preferred station) now has been moved to the lowest priority, level 1. Stations D, E, and F have been moved to the next higher priority level. Stations A and B stay at their previous priority levels with no change.

In cycle 3, stations A, B and E attempt to transmit. Since station A has the highest priority, it becomes the preferred station. Station B collides for the first time. Station E collides for the third time and station D is in backoff.

In cycle 4, stations B, E and F attempt to transmit. Station D is in backoff but has moved to the highest priority level. Since station E has the highest priority, it becomes the preferred station. Station B collides for the second time. Station F collides for the first time and station D keeps its high priority level.

After a few cycles this algorithm ensures that the station with the least recently used (LRU) link has moved up to the highest priority level. This station is called the LRU station and is the upper most station in TABLE II, The station with the most recently used (MRU) link has moved down to the lowest priority level. This station is called the MRU station and is the lower most station in TABLE II.

This algorithm is more suitable to the station behavior in an ETHERNET network. A station (station D in the example) which is in long backoff (draws a large random number) and does not attempt to link does not lose its priority with reference to those stations which do attempt to link or which complete an attempted transmission.

TABLE II

| PRI-ORITY | CYCLE 1 | CYCLE 2 | CYCLE 3 | CYCLE 4 |
|---|---|---|---|---|
| 6 | A | A | A (preferred) | D (backoff) |
| 5 | B | B (preferred) | D (backoff) | E (preferred) |
| 4 | C (preferred) | D (collision 1) | E (collision 3) | F (collision 1) |
| 3 | D | E (collision 2) | F | C |
| 2 | E (collision 1) | F | C | B (collision 2) |
| 1 | F | C | B (collision 1) | A |

While the invention has been particularly shown and described with reference to preferred embodiments thereof, it will be understood by those skilled in the art that the foregoing and other changes in form and detail may be made therein without departing from the scope of the invention.

What is claimed is:

1. A star local area network comprised of: a master hub;
   a plurality of master hub stations connected to said master hub;
   a slave hub including a slave buffer,
   a plurality of slave stations connected to said slave hub;
   SREQ link means for connecting said slave hub to said master hub;
   MACK link means for connecting said master hub to said slave hub;
   slave selection means for selecting a slave local preferred station at said slave hub from among ones of said plurality of slave stations that attempt to transmit a frame simultaneously to a destination station, said selecting being done by performing a precedence algorithm at said slave hub, said slave local preferred station having a slave local preferred station ID;
   slave transmission means for transmitting from said slave hub to said master hub, a slave local preferred station frame over said SREQ link;
   master selection means for selecting a master preferred station at said master hub from among ones of said plurality of master local stations that attempt to transmit a frame simultaneously to said destination station and said slave local preferred station frame, said selecting being done by performing a precedence algorithm at said master hub;
   master transmission means for transmitting from said master hub to said slave hub, a master preferred station frame over said MACK link, said master preferred station frame including a source address;
   slave decoding means for decoding said source address in said master preferred station frame received at said slave hub to thereby identify a station source ID at which said master preferred station frame originates;
   slave comparing means for comparing said station source ID with said slave local preferred station ID;
   slave transmission means for transmitting, from said slave station, said master preferred station frame to said slave local stations;
   slave storage means for storing said master preferred station frame in said slave buffer upon a condition that said station source ID and said slave local preferred station ID are not identical; and,
   SREQ link transmission means for transmitting from said slave station said master preferred station frame to said master hub over said SREQ link upon a condition that said station source ID and said slave local preferred station ID are identical.

2. The combination in accordance with claim 1 wherein said slave hub includes:
   a boundary detection means for detecting an inter frame spacing after said master preferred station frame;
   a retransmit logic connected to said boundary detection means and to said slave buffer for retransmitting said master preferred station frame from said slave buffer to said destination station immediately after detection of said inter frame spacing; and,
   collision frame generator means connected to said slave buffer for generating a collision frame upon a condition that said master preferred station frame is not successfully retransmitted from said slave buffer after a predetermined number of attempts.

3. The combination in accordance with claim 1 wherein said slave buffer means is comprised of a first-in first-out buffer of a depth sufficient to store a number bytes that results in a probability of failure to transmit of $10^{-8}$ plus a number of bytes sufficient to compensate for transmission propagation delay.

4. A star local area network comprised of:
   a master hub;
   a plurality of master hub stations connected to said master hub;
   a slave hub including a slave buffer,
   a plurality of slave stations connected to said slave hub;
   a SREQ link connecting said slave hub to said master hub;
   a MACK common link connecting said master hub to said slave hub;
   slave selection logic for selecting a slave local preferred station at said slave hub from among ones of said plurality of slave stations that attempt to transmit a frame simultaneously to a destination station, said selecting being done by performing a precedence algorithm at said slave hub, said slave local preferred station having a slave local preferred station ID;
   slave transmission controls for transmitting from said slave hub to said master hub, a slave local preferred station frame over said SREQ link;
   master selection logic for selecting a master preferred station at said master hub from among ones of said plurality of master local stations that attempt to transmit a frame simultaneously to said destination station and said slave local preferred station frame, said selecting being done by performing a precedence algorithm at said master hub;
   master transmission controls for transmitting from said master hub to said slave hub, a master preferred station frame over said MACK link, said master preferred station frame including a source address;

a slave decoder for decoding said source address in said master preferred station frame received at said slave hub to thereby identify a station source ID at which said master preferred station frame originates;

a slave comparator for comparing said station source ID with said slave local preferred station ID;

slave transmission controls for transmitting, from said slave station, said master preferred station frame to said slave local stations;

a slave buffer for storing said master preferred station frame in said slave buffer upon a condition that said station source ID and said slave local preferred station ID are not identical; and, SREQ link transmission logic for transmitting from said slave station said master preferred station frame to said master hub over said SREQ link upon a condition that said station source ID and said slave local preferred station ID are identical.

5. The combination in accordance with claim 4 wherein said slave hub includes:

a boundary detection logic for detecting an inter frame spacing after said master preferred station frame;

a retransmit logic connected to said boundary detection logic and to said slave buffer for retransmitting said master preferred station frame from said slave buffer to said destination station immediately after detection of said inter frame spacing; and, a collision frame generator connected to said slave buffer for generating a collision frame upon a condition that said master preferred station frame is not successfully retransmitted from said slave buffer after a predetermined number of attempts.

6. The combination in accordance with claim 4 wherein said slave buffer means is comprised of a first-in first-out buffer of a depth sufficient to store a number bytes that results in a probability of failure to transmit of $10^{-8}$ plus a number of bytes sufficient to compensate for transmission propagation delay.

7. A method of transmitting message frames within a star local area network comprised of a master hub and a slave hub, said slave hub including a slave buffer, a plurality of slave stations being connected to said slave hub, a plurality of master hub stations being connected to said master hub, said slave hub being connected to said master hub by a SREQ link from said slave hub to said master hub and MACK link from said master hub to said slave hub, said method comprising the steps of:

A. selecting a slave local preferred station at said slave hub from among ones of said plurality of slave stations that attempt to transmit a frame simultaneously to a destination station, said selecting being done by performing a precedence algorithm at said slave hub, said slave local preferred station having a slave local preferred station ID;

B. transmitting from said slave hub to said master hub, a slave local preferred station frame over said SREQ link;

C. selecting a master preferred station at said master hub from among ones of said plurality of master local stations that attempt to transmit a frame simultaneously and said slave local preferred station frame, said selecting being done by performing a precedence algorithm at said master hub;

D. transmitting from said master hub to said slave hub, a master preferred station frame over said MACK link, said master preferred station frame including a source address;

E. decoding said source address in said master preferred station frame received at said slave hub to thereby identify a station source ID at which said master preferred station frame originates;

F. comparing said station source ID with said slave local preferred station ID;

G. transmitting, from said slave station, said master preferred station frame to said slave local stations;

H. storing said master preferred station frame in said slave buffer upon a condition that said station source ID and said slave local preferred station ID are not identical; and, I. transmitting from said slave station said master preferred station frame to said master hub over said SREQ link upon a condition that said station source ID and said slave local preferred station ID are identical.

8. The method of claim 7 wherein said master preferred station frame includes a destination address, said method further comprising the steps of:

J. retransmitting said master preferred station frame from said slave buffer to said destination station immediately after an inter frame spacing after said master preferred station frame, upon a condition that a collision occurs between said master preferred station frame and said destination station frame received from said master preferred station; and, K. generating a collision frame at said slave hub upon a condition that said preferred station frame is not successfully retransmitted from said slave buffer after a predetermined number of attempts.

9. The method of claim 7 wherein said step C said precedence algorithm comprises the steps of:

J. assigning each said station an initial priority level from among a plurality of priority levels;

K. designating a station the preferred station upon a condition that said station has a highest initial priority level among priority levels of stations which attempt to transmit;

L. assigning a new priority level to said preferred station, upon a condition that said preferred station successfully completes transmission, said new priority level being a lowest priority level from among said plurality of priority levels, and, M. increasing each priority level by one level for of all stations whose priority level is lower than said initial priority level of said preferred station, upon said condition that said preferred station successfully completes transmission.

10. The method of claim 8 wherein said step C said precedence algorithm comprises the steps of:

L. assigning each said station an initial priority level from among a plurality of priority levels;

M. designating a station the preferred station upon a condition that said station has a highest initial priority level among priority levels of stations which attempt to transmit;

N. assigning a new priority level to said preferred station, upon a condition that said preferred station successfully completes transmission, said new priority level being a lowest priority level from among said plurality of priority levels, and, O. increasing each priority level by one level for of all stations whose priority level is lower than said initial priority level of said preferred station, upon said condition that said preferred station successfully completes transmission.

11. The method of claim 9 wherein said step C said precedence algorithm comprises the steps of:

N. assigning each said station an initial priority level from among a plurality of priority levels;

O. designating a station the preferred station upon a condition that said station has a highest initial priority level among priority levels of stations which attempt to transmit;

P. assigning a new priority level to said preferred station, upon a condition that said preferred station successfully completes transmission, said new priority level being a lowest priority level from among said plurality of priority levels, and, Q. increasing each priority level by one level for of all stations whose priority level is lower than said initial priority level of said preferred station, upon said condition that said preferred station successfully completes transmission.

* * * * *